Patented May 8, 1951

2,552,422

UNITED STATES PATENT OFFICE 2,552,422

HYDROCARBON SYNTHESIS

Bruce G. Gillespie, Atlantic Highlands, N. J., assignor to Standard Oil Development Company, a corporation of Delaware No Drawing. Application May 9, 1947, Serial No. 747,125

4 Claims. (Cl. 260—449.6)

This invention relates to catalytic conversions and improved catalysts therefor. More specifically, the invention is concerned with improved iron catalysts for the catalytic synthesis of normally liquid hydrocarbons and/or oxygenated compounds from CO and $H_2$.

Iron type catalysts are normally employed in the hydrocarbon synthesis at relatively high temperatures of about 450°–800° F. and relatively high pressures of about 3–100 atmospheres abs. or higher, to obtain predominantly unsaturated and oxygenated products from which motor fuels with high octane ratings may be recovered. The catalysts are usually prepared by the reduction of various natural or synthetic iron oxides or by the decomposition of iron carbonyls, the catalytic activity being enhanced by the addition of such promoters as various compounds of alkali metals or the oxides of chromium, zinc, aluminum, magnesium, manganese, the rare earth metals, and others in small amounts of about 1–10%.

Many of these catalysts have satisfactory and even excellent activity characteristics. However, most iron catalysts and particularly those having the highest activity and selectivity for the formation of normally liquid products have a strong tendency for the formation of large amounts of a coke- or carbon-like material which is deposited on the catalyst and weakens its structural strength.

The tendency of iron catalysts toward carbon formation creates the most serious difficulties when the so-called fluid catalyst technique is employed wherein the synthesis gas is contacted with a dense, turbulent, ebullient bed of finely divided catalyst fluidized by the upwardly flowing gaseous reactants and reaction products. The advantages of this technique, which reside mainly in a greatly improved temperature and process control of the highly exothermic synthesis process, are bound to the maintenance of a fairly uniform particle size distribution within the catalyst bed. When the catalyst structure weakens under the influence of carbon formation, the catalyst particles break up rapidly as a result of the strong mechanical stresses of fluid operation, the bed density declines and serious operational trouble ensues.

It is known that the tendency toward carbon formation may be appreciably reduced by sintering iron catalyst in a reducing atmosphere and I have found that well fluidizable iron catalysts of suitable mechanical strength to retain their size in fluid operation may be obtained by grinding sintered iron catalysts, particularly iron catalysts sintered in a reducing atmosphere, to a fluidizable particle size. Catalysts of this type and methods for their preparation and use are described and claimed in my copending application, Serial No. 674,371, filed June 4, 1946, now Patent No. 2,496,343.

While these sintered iron catalysts exhibit excellent disintegration resistance, it has been observed that the sintering treatment partially or temporarily inactivates the catalyst so that they must be subjected to a long activation or induction treatment at synthesis conditions before they reach a degree of activity useful for practical operation.

The present invention is mainly directed toward a reduction of this activation or induction period, but the invention affords various additional advantages as will be fully understood from the more detailed description given below.

It is, therefore, the principal object of the present invention to provide an improved process for the catalytic conversion of CO with $H_2$.

Another object of the invention is to provide an improved iron catalyst for the hydrocarbon synthesis and a method of preparing the same.

A more specific object of the invention is to provide means for reducing the activation or induction period required by sintered iron catalysts used in the hydrocarbon synthesis.

Other and further objects and advantages will appear hereinafter.

In accordance with the present invention, the induction or activation period of sintered iron catalysts may be substantially reduced by incorporating into the catalyst prior to sintering a small amount of finely divided carbon. The carbon content of the catalyst may vary between about 2 and 10% by weight of iron, calculated as $Fe_2O_3$, best results being obtained with a carbon content of about 5–8%. While finely divided carbon in any form may be used, the incorporation of powdered activated carbon is preferred. In addition to carbon, the catalyst of the invention preferably contains one or more of the conventional promoters, preferably oxides, carbonates or halides, particularly carbonates or fluorides, of alkali metals, preferably sodium or potassium.

It is important, for the catalytic and mechanical properties of the catalysts of the invention, that the sintering treatment be subsequent to any treatment with liquids or solids, which affects the chemical and/or physical structure of the catalyst. When preparing the catalyst of the invention, it is preferred, therefore, to combine iron oxide with the carbon and any addition agents desired, such as promoters, by mechanical mixing, impregnation, and the like, and to subject the resulting composite to sintering.

The sintered material may be broken up to form lumps or pills useful for fixed or moving bed operation or it may be ground to a fluidizable particle size of about 50–400 mesh. Larger sized catalysts may also be produced by forming particles of the approximate desired size prior to sintering and subjecting the preformed particles to sintering. In this manner, losses of carbon due to grinding and irregularities of the carbon content of the final catalyst particles are minimized.

Sufficiently pure iron oxides of any origin such as oxidic ores, pyrites ashes or the like may serve as starting materials for the catalysts of the invention. However, best results are obtained when fine iron oxide powders, particularly the precipitated material known as red iron oxide, are employed, which have substantially uniform particle sizes of less than, say, about 50 microns and preferably less than about 30 microns. These iron oxide powders may first be thoroughly mixed with the desired amount of powdered carbon and the mixture then uniformly impregnated with a suitable solution of the promoter to form a paste. The paste may be dried, sintered and ground to the desired size or sized prior to sintering. A reducing treatment may precede or follow the sintering treatment, but in accordance with the preferred embodiment of the invention, the sintering treatment is carried out in a reducing atmosphere using hydrogen, carbon monoxide, gaseous hydrocarbons or the like, or mixture of such reducing gases.

Suitable sintering temperatures fall within the approximate range of 1200°–1600° F. in a reducing atmosphere, but may be considerably higher in a non-reducing atmosphere. For instance, in an inert atmosphere of nitrogen or the like, it may range anywhere from about 1600° to about 2700° F. The sintering treatment should be carried at least to a point at which surface deformation of the sintered particles becomes appreciable. Reduction temperatures within the range of from about 700° to about 1500° F. are generally adequate to obtain the desired degree of reduction which may reach the metallic state or any oxygen concentration known to be beneficial for iron catalysts.

A typical method suitable for preparing iron catalysts useful in fluid catalyst operation is illustrated by the following example.

*Example*

To 286.0 grams of pure red iron oxide powder having a particle size of about 10–20 microns, there is added 14.32 grams of finely powdered activated carbon of a similar particle size. The materials are thoroughly mixed and the mixture formed is impregnated with a solution of 3.26 grams of $K_2CO_3$ in about 200 ml. of distilled water to form a smooth paste which is thoroughly mulled to accomplish uniformity of composition throughout the mass. The paste is air-dried for 18–24 hours, then dried at 230°–350° F. for about 2–5 hours, sized to pass a 20 mesh sieve, and thereafter pilled to form $\frac{3}{16}''$ pellets. The catalyst in then reduced in hydrogen at temperatures up to 900° F. for 4 hours whereupon the temperature is raised to 1600° F. during the next 2–4 hours. Finally the catalyst is sintered in hydrogen for 4 more hours. The sintered catalyst is cooled in hydrogen and is then ready for use in fixed bed units. It may be sized for fluid operation by grinding in a planetary disc grinder, for example. The final catalyst consists of 91.8% Fe, 6.7% C and 1.5% $K_2CO_3$.

This catalyst was tested in a fixed bed once-through hydrocarbon synthesis unit using 1/1 $H_2/CO$ ratio feed gas at 400 p. s. i. g. pressure with the results tabulated below. Also included in the table are comparative results obtained with a similar catalyst prepared without the addition of carbon.

| Promoter Content | 1.5% $K_2CO_3$+6.7% C | 1.5% $K_2CO_3$ |
|---|---|---|
| Temperature, ° F | 650 | 670 |
| Feed Rate, v./v./hr | 2,100 | 2,310 |
| Yields, Output Basis, cc./m.³ Conv. Feed: | | |
| Total Useful Product | 193 | 190 |
| $C_4+$ | 179 | 176 |
| Oxygenated Compounds in Water | 14 | 14 |
| Oxygenated Compounds in Oil | 43 | 44 |
| Oxygenated Compounds, Total | 57 | 58 |
| CO Conversion, Per Cent | 97.2 | 95.8 |
| $H_2$ Conversion, Per Cent | 80.4 | 76.2 |
| Material Balance, Per Cent | 91.8 | 88.7 |
| Converted CO Going to $CO_2$, Per Cent | 40.1 | 39.5 |
| Selectivities: Distribution of C in $C_1+$ plus Oxygenated Compounds in Water, Per Cent: | | |
| $C_1$–$C_3$ | 37.8 | 41.6 |
| $C_4+$ | 58.4 | 54.8 |
| C in Water Layer | 3.8 | 3.6 |
| Induction Period, Hours | 75 | 140 |

It will be noted that the induction period is nearly halved for the carbon-containing catalyst of the invention, and that the activity of this catalyst is higher as shown by higher CO and $H_2$ conversions at a 20° F. lower temperature level. Excellent yields both of $C_4+$ oil and oxygenated compounds were obtained in both cases; these yields are essentially identical for each catalyst, and show that the addition of carbon does not adversely affect the yields.

The fact that the carbon-containing catalyst of the present invention has highly satisfactory structural strength and a low carbon-forming tendency has been shown by the successful operation of the testing unit over an extended period of time of more than 250 hours without any evidence of catalyst deterioration without any loss of catalyst activity and without excessive carbon formation. When employing the fluid catalyst technique this low carbonization tendency and increased distintegration resistance are likewise realized and contribute substantially to the ease of fluidization and the maintenance of constant and uniform catalyst bed characteristics over long periods of time.

While the foregoing description and exemplary operations have served to illustrate specific applications and results of my invention, other modifications obvious to those skilled in the art are within the scope of my invention. Only such limitations should be imposed on the invention as are indicated in the appended claims.

I claim:

1. An improved process for producing valuable conversion products from CO and $H_2$ in the presence of iron catalysts which comprises contacting a gas containing CO and $H_2$ in synthesis proportions at synthesis conditions with a fluidized mass of particles of fluidizable size consisting essentially of hydrogen reduced iron oxide in the form of discrete particles, each containing finely divided carbon substantially uniformly distributed therethrough and a promotional amount of an alkali metal promoter.

2. The process of claim 1 wherein said catalyst particles are prepared by a method consisting essentially in thoroughly mixing red iron oxide powder with about 2-10% by weight of powdered carbon, incorporating a minor promotional amount of an alkali metal promoter, reducing said iron oxide powder with hydrogen at temperatures up to 900° F. sintering the resulting mixture in a reducing atmosphere and grinding the sintered material to a fluidizable particle size.

3. The process of claim 2 wherein said mixture is impregnated with a solution of said alkali metal promoter and the impregnated mixture is dried prior to sintering.

4. An improved process for producing valuable conversion products from CO and $H_2$ in the presence of iron catalysts which comprises contacting a gas containing CO and $H_2$ in synthesis proportions at synthesis conditions with a fluidized mass of discrete particles of fluidizable solids, each particle consisting essentially of sintered reduced iron oxide, about 2 to 10% by weight of finely divided carbon substantially uniformly distributed throughout each particle of iron and a minor promotional amount of an alkali metal promoter.

BRUCE G. GILLESPIE.

REFERENCES CITED

The following references are of record in the file of this patent:

UNITED STATES PATENTS

| Number | Name | Date |
|---|---|---|
| 1,148,570 | Bosch et al. | Aug. 13, 1915 |
| 1,168,404 | Lucas | Jan. 18, 1916 |
| 2,197,707 | Crittenden | Apr. 16, 1940 |
| 2,209,492 | Spicer | July 30, 1940 |
| 2,211,022 | Michael et al. | Aug. 13, 1940 |
| 2,220,261 | Michael et al. | Nov. 5, 1940 |
| 2,417,164 | Huber, Jr. | Mar. 11, 1947 |

FOREIGN PATENTS

| Number | Country | Date |
|---|---|---|
| 5,847 of 1914 | Great Britain | June 7, 1915 |